US012711180B2

(12) United States Patent
Mishaeli et al.

(10) Patent No.: US 12,711,180 B2
(45) Date of Patent: Aug. 18, 2026

(54) SYSTEM AND METHOD FOR DATABASE SCHEMA MATCHING

(71) Applicant: Microsoft Technology Licensing, LLC, Redmond, WA (US)

(72) Inventors: Moshik Mishaeli, Givatayim (IL); Eitam Shitrit, Haifa (IL); Menachem Brief, Haifa (IL); Oren Elisha, Herzliya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/933,572

(22) Filed: Oct. 31, 2024

(65) Prior Publication Data

US 2025/0278434 A1 Sep. 4, 2025

Related U.S. Application Data

(60) Provisional application No. 63/559,797, filed on Feb. 29, 2024.

(51) Int. Cl.

| | |
|---|---|
| ***G06F 16/00*** | (2019.01) |
| ***G06F 16/21*** | (2019.01) |
| ***G06F 16/25*** | (2019.01) |
| ***G06F 16/903*** | (2019.01) |

(52) U.S. Cl.
CPC ...... *G06F 16/90335* (2019.01); *G06F 16/211* (2019.01); *G06F 16/258* (2019.01); *G06F 16/213* (2019.01)

(58) Field of Classification Search
CPC ............ G06F 16/90335; G06F 16/211; G06F 16/258; G06F 16/213
USPC .......................................................... 707/723
See application file for complete search history.

(56) References Cited

U.S. PATENT DOCUMENTS

| | | | | |
|---|---|---|---|---|
| 12,373,404 B2 * | 7/2025 | Feghhi | .................. | G06F 16/213 |
| 2020/0081899 A1 * | 3/2020 | Shapur | .................. | G06F 16/211 |
| 2023/0073312 A1 * | 3/2023 | Portisch | ................ | G06F 16/258 |

OTHER PUBLICATIONS

"Introducing ChatGPT," available at https://openai.com/blog/chatgpt, OpenAI Blog, OpenAI, San Francisco CA, Nov. 30, 2022, 11 pages.

Achiam, et al., "GPT-4 Technical Report," arXiv, arXiv:2303.08774v4 [cs.CL], Dec. 19, 2023, 100 pages.

(Continued)

*Primary Examiner* — Chelcie L Daye
(74) *Attorney, Agent, or Firm* — Workman Nydegger

(57) ABSTRACT

A method, computer program product, and computing system for matching database schemas to align attributes in corresponding tables. A first attribute of a source table structured according to a source schema is represented in a document format and a plurality of target tables structured according to a target schema are represented in the document format. The document format of each of the plurality of target tables are searched to retrieve a set of target tables that include second attributes corresponding to the first attribute based on semantic similarity between the first attribute and the plurality of target tables, and a set of second attributes is selected from the retrieved set of target tables that are similar to the first attribute using a large language model (LLM). A ranked list of second attributes that match the first attribute is then generated.

20 Claims, 11 Drawing Sheets

(56) References Cited

OTHER PUBLICATIONS

Bernstein, et al., "Generic Schema Matching, Ten Years Later", Proceedings of the VLDB Endowment, ResearchGate, Aug. 2011, 7 pages.
Brown, et al., "Language Models are Few-Shot Learners", In Journal of Advances in neural information processing systems, vol. 33, Dec. 6, 2020, 25 Pages.
Chernev, et al., "Choice overload: A conceptual review and meta-analysis", Journal of Consumer Psycology, vol. 25, Issue No. 2, Apr. 2015, pp. 333-358.
Devlin, et al., "BERT: Pre-training of Deep Bidirectional Transformers for Language Understanding," arXiv, arXiv:1810.04805v2 [cs.CL], May 24, 2019, 16 pages.
Do, et al., "COMA—A System for Flexible Combination of Schema Matching Approaches", Proceedings of the 28th international conference on Very Large Data Bases, Aug. 2002, 12 pages.
Dragisic, et al., "User validation in ontology alignment", International Semantic Web Conference, Oct. 2016, 16 pages.
Gal, Avigdor, "Uncertain schema matching: the power of not knowing", Proceedings of the 20th ACM international conference on Information and knowledge management, Oct. 24, 2011, pp. 2615-2616.
Gal, et al., "Learning to Rerank Schema Matches", IEEE Transactions on Knowledge and Data Engineering, vol. 33, Issue No. 08, Aug. 2021, 14 pages.
Greene, et al., "New and improved embedding model", Open AI, Dec. 15, 2022, 2 pages.
Jhonson, et al., "MIMIC-III, a freely accessible critical care database", Scientific Data, May 2016, 9 pages.
Koutras, et al., "Valentine: Evaluating Matching Techniques for Dataset Discovery", IEEE 37th International Conference on Data Engineering, Feb. 13, 2021, 12 pages.
Lewis, et al., "Retrieval-Augmented Generation for Knowledge-Intensive NLP Tasks", 34th Conference on Neural Information Processing Systems, vol. 4, Apr. 12, 2021, 19 Pages.
Li, et al., "Deep entity matching with pre-trained language models", Arxiv Cornell University, Sep. 2, 2020, 15 pages.
Liu, et al., "Summary of ChatGPT-Related Research and Perspective Towards the Future of Large Language Models", Arxiv Cornell University, Aug. 22, 2023, 22 pages.
Madhavan, et al., "Generic Schema Matching with Cupid", accessed on URL: https://www.semanticscholar.org/paper/Generic-Schema-Matching-with-Cupid-Madhavan-Bernstein/7ff9bf4d58358fc008b059028a3e33919d12b335, Sep. 11, 2001, 10 pages.
Minaee, et al., "Deep Learning Based Text Classification: A Comprehensive Review", Arxiv Cornell University, Jan. 4, 2021, 43 pages.
Mirchandani, et al., "Large Language Models as General Pattern Machines", Arxiv Cornell University, Oct. 26, 2023, 21 pages.
Mudgal, et al., "Deep Learning for Entity Matching: A Design Space Exploration", Proceedings of the 2018 International Conference on Management of Data, May 27, 2018, 16 pages.
Narayan, et al., "Can Foundation Models Wrangle Your Data?", Proceedings of the VLDB Endowment, vol. 16, Issue No. 4, Dec. 2022, 12 pages.
Neelakanthan, et al., "Text and Code Embeddings by Contrastive Pre-Training", Arxiv Cornell University arXiv:2201.10005, Jan. 24, 2022, 13 pages.
Paris, et al., "Transformation and Evaluation of the MIMIC Database in the OMOP Common Data Model: Development and Usability Study", JMIR Medical Informatics, vol. 9, Issue No. 12, Dec. 2021, 14 pages.
Radford, et al., "Improving Language Understanding by Generative Pre-Training," In Technical Report, OpenAI, Jun. 11, 2018, 12 Pages.
Radford, et al., "Language Models are Unsupervised Multitask Learners," available at https:IIopenai.comlblog/better-language-models/in, in OpenAI blog, Feb. 2019, 24 pages.
Rocchio, J., "Relevance feedback in information retrieval", The Smart retrieval system—experiments in automatic document processing, 1971, pp. 313-323.
Sheetrit, et al., "ReMatch: Retrieval Enhanced Schema Matching with LLMs", Arxiv Cornell University, Mar. 3, 2024, 10 pages.
Shraga, et al., "ADnEV: Cross-Domain Schema Matching using Deep Similarity Matrix Adjustment and Evaluation", Proceedings of the VLDB Endowment, vol. 13, No. 9, May 2020, pp. 1401-1415.
Shraga, et al., "Learning to Characterize Matching Experts", IEEE 37th International Conference on Data Engineering, Dec. 2021, 13 pages.
Sun, et al., "How to Fine-Tune BERT for Text Classification?", China National Conference on Chinese Computational Linguistics, Feb. 5, 2020, 10 pages.
Vaswani, et al., "Attention is all you need.", Advances in neural information processing systems 30, 2017, 11 Pages.
Walonoski, et al., "Synthea: An approach, method, and software mechanism for generating synthetic patients and the synthetic electronic health care record", Journal of the American Medical Informatics Association, Mar. 2018, vol. 25, Issue No. 3, pp. 230-238.
Zhang, et al., "SMAT: An attention-based deep learning solution to the automation of schema matching," Advances in databases and information systems, Aug. 2021, pp. 260-274.
Zhang, et al., "Large Language Models as Data Preprocessors", arXiv:2308.16361, Aug. 30, 2023, 5 pages.
Zhang, et al., "Schema Matching using Pre-Trained Language Models", IEEE 39th International Conference on Data Engineering (ICDE), Jul. 2023, 14 pages.

* cited by examiner

300

304 308 312

| Patient ID | Hosp ID | Admit Time | Discharge Time | Death Time | Admission Type | Admission Location | Discharge Location | Insurance |
|---|---|---|---|---|---|---|---|---|
| 10006 | 142345 | 2004-10-23 10:22 | 2004-11-01 08:00 | | Emergency | Emergency Room | Home Health Care | Medicare |
| 10011 | 105331 | 2006-08-14 09:17 | 2006-08-28 15:52 | 2006-08-28 15:52 | Emergency | Transfer from Hospital | Dead | Private |
| 10013 | 165520 | 2005-10-04 06:54 | 2005-10-07 10:45 | 2005-10-07 10:45 | Emergency | Transfer from Hospital | Dead | Medicare |
| 10017 | 199207 | 2009-06-03 09:41 | 2009-06-03 17:30 | | Emergency | Emergency Room | Home Health Care | Medicare |
| 10019 | 177759 | 2003-05-06 12:10 | 2003-05-15 17:00 | 2003-05-15 17:00 | Emergency | Transfer from Hospital | Dead | Private |

| Person ID | Visit ID | Start Datetime | End Datetime | Visit Type | Admitted from | Discharge to |
|---|---|---|---|---|---|---|
| 10006 | 142345 | 2004-10-23 10:22 | 2004-11-01 08:00 | Emergency | Emergency Room Admit | Home Health Care |
| 10011 | 105331 | 2006-08-14 09:17 | 2006-08-28 15:52 | Emergency | Transfer from Hosp | Dead |
| 10013 | 165520 | 2005-10-04 06:54 | 2005-10-07 10:45 | Emergency | Transfer from Hosp | Dead |
| 10017 | 199207 | 2009-06-03 09:41 | 2009-06-03 17:30 | Emergency | Emergency Room Admit | Home Health Care |
| 10019 | 177759 | 2003-05-06 12:10 | 2003-05-15 17:00 | Emergency | Transfer from Hosp | Dead |

FIG. 4

| INPUTS | | OUTPUTS | |
|---|---|---|---|
| SOURCE SCHEMA: | Hospital Database | For every attribute (column) in the hospital database | 3 (K) possible matching columns from the analytical schema |
| TARGET SCHEMA: | Analytical Data Model Schema | | |

For this example, J = 2; K = 3

J = Number of tables retrieved

K = Number of suggested attribute matches

| 702 Hospital Database Table | 704 Hospital Database Columns | 706 Analytical Schema Table 1 | 708 Analytical Schema Column 1 | 710 Analytical Schema Table 2 | 712 Analytical Schema Column 2 | 714 Analytical Schema Table 3 | 716 Analytical Schema Column 3 |
|---|---|---|---|---|---|---|---|
| Admissions | PATIENT_ID | VISITS | person_id | VISIT_DETAIL | person_id | COHORT | Subject_id |
| Admissions | HOSP_ID | VISITSID | visit_ id | VISIT_DETAIL | visit _id | NA | NA |
| Admissions | ADMIT_TIME | VISITS | start_datetime | VISIT_DETAIL | start_datetime | NA | NA |
| Admissions | DISCH_TIME | VISITS | end_datetime | VISIT_DETAIL | end_datetime | | |
| Admissions | DEATH_TIME | — | — | NA | NA | NA | NA |
| Admissions | ADMISSION_TYPE | VISITS | visit_type | VISIT_DETAIL | visit_detail | NA | NA |
| Admissions | ADMISSION_LOCATION | VISITS | admitted_from | VISIT_DETAIL | visit_detail_source | NA | NA |
| Admissions | DISCHARGE_LOCATION | VISITS | discharge_to | VISIT_DETAIL | NA | NA | NA |
| Admissions | INSURANCE | — | — | NA | NA | NA | NA |
| Admissions | LANGUAGE | — | — | NA | NA | NA | NA |
| Admissions | RELIGION | — | — | NA | NA | NA | NA |
| Admissions | MARITAL_STATUS | | | NA | NA | NA | NA |
| Admissions | ETHNICITY | PERSON | ethnicity _id | NA | NA | NA | NA |

| Hospital Database Table | Hospital Database Columns | 802 Analytical Schema Table 1 | 806 Analytical Schema Column 1 | 810 Analytical Schema Table 2 | 814 Analytical Schema Column 2 | 818 Analytical Schema Table 3 | 822 Analytical Schema Column 3 |
|---|---|---|---|---|---|---|---|
| ADMISSIONS | ADMIT_TIME | VISITS | start_datetime | VISIT_DETAIL | start_datetime | VISIT_DETAIL | end_datetime |

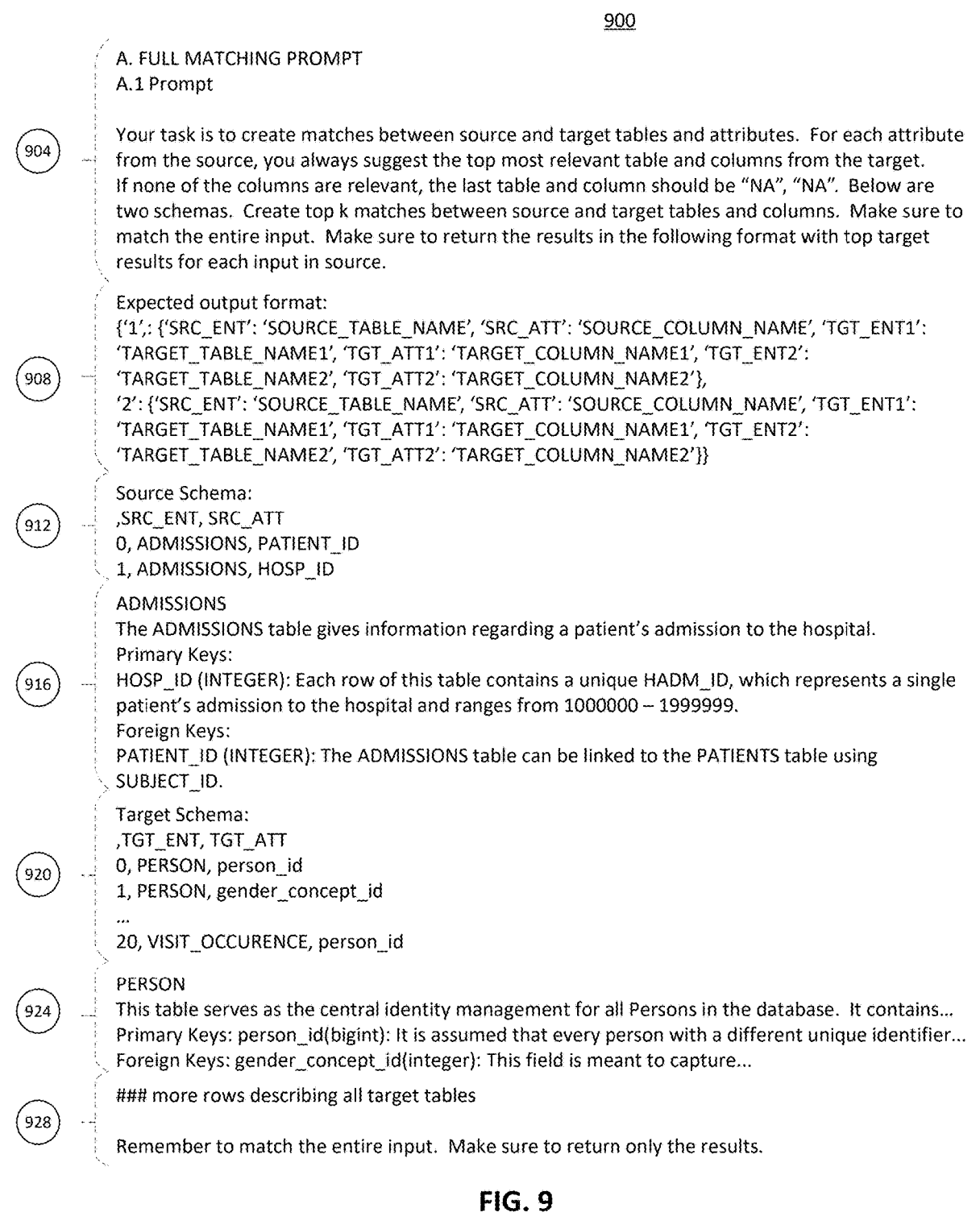

A. FULL MATCHING PROMPT
A.1 Prompt

904

Your task is to create matches between source and target tables and attributes. For each attribute from the source, you always suggest the top most relevant table and columns from the target. If none of the columns are relevant, the last table and column should be "NA", "NA". Below are two schemas. Create top k matches between source and target tables and columns. Make sure to match the entire input. Make sure to return the results in the following format with top target results for each input in source.

908

Expected output format:
{'1',: {'SRC_ENT': 'SOURCE_TABLE_NAME', 'SRC_ATT': 'SOURCE_COLUMN_NAME', 'TGT_ENT1': 'TARGET_TABLE_NAME1', 'TGT_ATT1': 'TARGET_COLUMN_NAME1', 'TGT_ENT2': 'TARGET_TABLE_NAME2', 'TGT_ATT2': 'TARGET_COLUMN_NAME2'},
'2': {'SRC_ENT': 'SOURCE_TABLE_NAME', 'SRC_ATT': 'SOURCE_COLUMN_NAME', 'TGT_ENT1': 'TARGET_TABLE_NAME1', 'TGT_ATT1': 'TARGET_COLUMN_NAME1', 'TGT_ENT2': 'TARGET_TABLE_NAME2', 'TGT_ATT2': 'TARGET_COLUMN_NAME2'}}

912

Source Schema:
,SRC_ENT, SRC_ATT
0, ADMISSIONS, PATIENT_ID
1, ADMISSIONS, HOSP_ID

916

ADMISSIONS
The ADMISSIONS table gives information regarding a patient's admission to the hospital.
Primary Keys:
HOSP_ID (INTEGER): Each row of this table contains a unique HADM_ID, which represents a single patient's admission to the hospital and ranges from 1000000 – 1999999.
Foreign Keys:
PATIENT_ID (INTEGER): The ADMISSIONS table can be linked to the PATIENTS table using SUBJECT_ID.

920

Target Schema:
,TGT_ENT, TGT_ATT
0, PERSON, person_id
1, PERSON, gender_concept_id
...
20, VISIT_OCCURENCE, person_id

924

PERSON
This table serves as the central identity management for all Persons in the database. It contains...
Primary Keys: person_id(bigint): It is assumed that every person with a different unique identifier...
Foreign Keys: gender_concept_id(integer): This field is meant to capture...

928 more rows describing all target tables

Remember to match the entire input. Make sure to return only the results.

FIG. 9

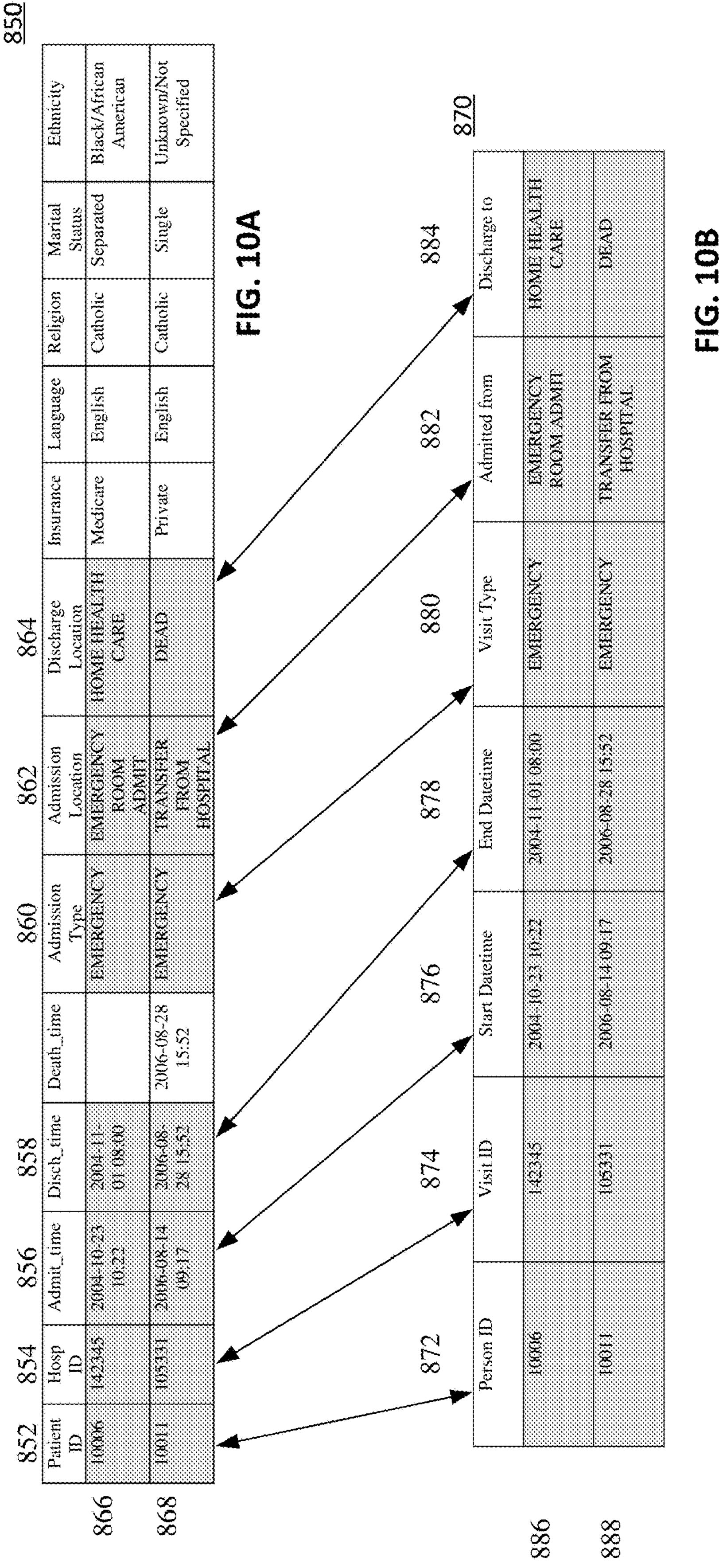
850
852
854
856
858
860
862
864
866
868
Patient ID
Hosp ID
Admit_time
Disch_time
Death_time
Admission Type
Admission Location
Discharge Location
Insurance
Language
Religion
Marital Status
Ethnicity
10006
142345
2004-10-23 10:22
2004-11-01 08:00
EMERGENCY
EMERGENCY ROOM ADMIT
HOME HEALTH CARE
Medicare
English
Catholic
Separated
Black/African American
10011
105331
2006-08-14 09:17
2006-08-28 15:52
2006-08-28 15:52
EMERGENCY
TRANSFER FROM HOSPITAL
DEAD
Private
English
Catholic
Single
Unknown/Not Specified
FIG. 10A
870
872
874
876
878
880
882
884
886
888
Person ID
Visit ID
Start Datetime
End Datetime
Visit Type
Admitted from
Discharge to
10006
142345
2004-10-23 10:22
2004-11-01 08:00
EMERGENCY
EMERGENCY ROOM ADMIT
HOME HEALTH CARE
10011
105331
2006-08-14 09:17
2006-08-28 15:52
EMERGENCY
TRANSFER FROM HOSPITAL
DEAD
FIG. 10B

SYSTEM AND METHOD FOR DATABASE SCHEMA MATCHING

RELATED APPLICATION(S)

This application claims the benefit of U.S. Provisional Application No. 63/559,797, filed on 29 Feb. 2024, the entire contents of which are incorporated herein by reference.

BACKGROUND

Schema matching is a crucial task in data integration, involving the alignment of a source database schema with a target schema to establish correspondence between their elements. This task is challenging due to textual and semantic heterogeneity, as well as differences in schema sizes. Although machine-learning-based solutions have been explored in numerous studies, they often suffer from low accuracy, require manual mapping of the schemas for model training, or need access to source schema data which might be unavailable due to privacy concerns.

BRIEF DESCRIPTION OF THE DRAWINGS

FIGS. 3 and 4 depict example source and target data tables, respectively;

FIG. 6 depicts an example statement in accordance with embodiments of the disclosure;

FIG. 7 depicts matching of the source table corresponding to attributes in multiple target tables;

FIG. 8 depicts a match between a source attribute and multiple target table attributes;

FIG. 9 depicts a prompt generated to match a source attribute to candidate target attributes;

FIGS. 10A and 10B depict output source and target tables showing matching attributes between the tables.

Like reference symbols in the various drawings indicate like elements.

DETAILED DESCRIPTION

Schema matching is a fundamental task in data management and integration, involving the identification of semantic correspondences between elements of two or more database schemas. This process is essential as it lays the groundwork for various data manipulation and integration tasks, including data warehousing, database federation, and the merging of information systems. At its core, schema matching aims to establish mappings between schema elements that are semantically related, regardless of differences in naming, structure, or data type.

The necessity for schema matching arises from the ever-growing volume of data generated by diverse applications and organizations, where data is often trapped in siloed repositories, each with its unique schema. In domains ranging from healthcare to retail, efficient schema matching can lead to more informed decision-making, seamless integration of heterogeneous systems, and ultimately, a competitive advantage in data-driven insights.

However, the schema matching task is challenging due to several inherent complications. Firstly, schemas are designed with different perspectives and terminologies, namely textual heterogeneity, reflecting the conceptualization of domain experts from disparate fields. This semantic heterogeneity can lead to ambiguous mappings where schema elements have the same name but different meanings, or different names but the same meaning. Secondly, structural heterogeneity compounds this complexity, with schemas exhibiting varied architectures, hierarchies, constraints, and model granularity differences.

Human schema matching, a manual and time-consuming process, requires significant effort from skilled individuals. This can be expensive and impractical, particularly in large-scale projects. Furthermore, human matchers are prone to errors and inconsistencies due to cognitive biases and fatigue. Their performance can also be influenced by the complexity and ambiguity of the schema elements, leading to potential inaccuracies in the matched results. As a result, the automation of schema matching has become a major focus within the AI and database-oriented research community over the years.

Large language models (LLMs) have achieved significant advancements across many challenging tasks that require a deep understanding of semantics. This includes tasks that until recently required significant human efforts. These models have shown an impressive ability to generalize to new tasks without any task-specific fine-tuning, even in areas significantly divergent from the ones they were originally trained on, including various data related tasks.

Figure 1:
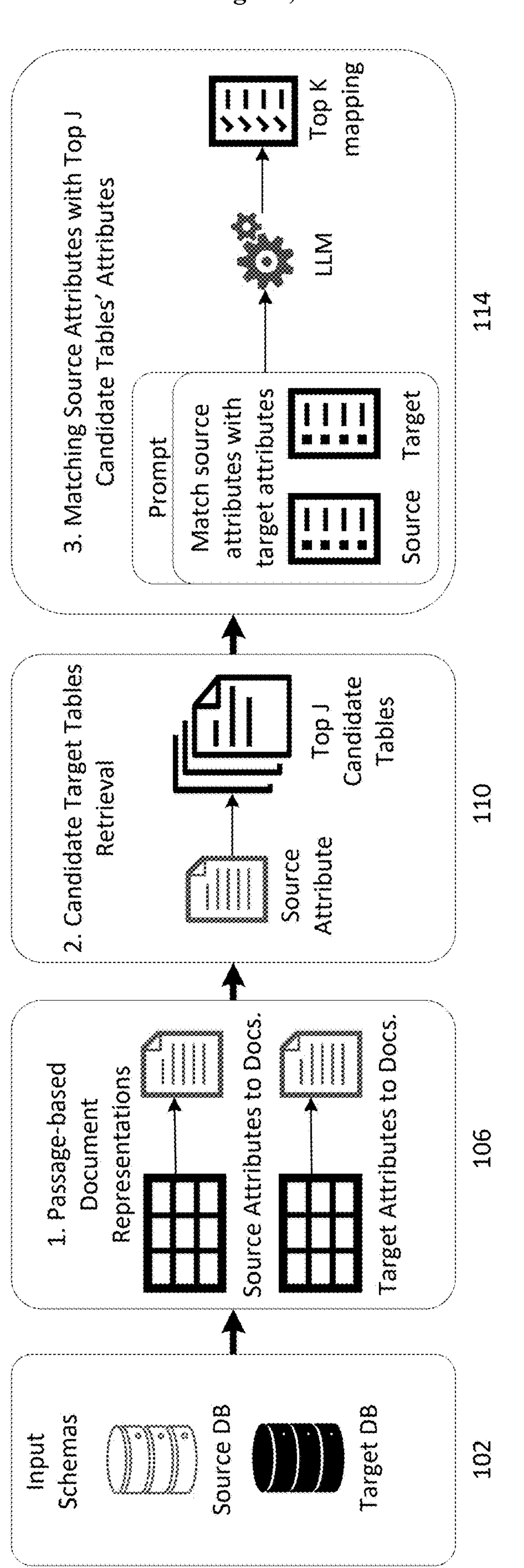
FIG. 1 is a diagrammatic view of a schema matching process.

As will be discussed in greater detail below, implementations of the present disclosure are directed to a system and method for matching a source database schema to a target database schema. Referring to FIG. 1, in an implementation of the disclosure, in a system in which a source database has a first schema and a target database has a second schema, 102, a source attribute in a source table of the source schema is represented as a passage-based structured document and a plurality of target tables of the target schema are represented as passage-based structured documents, 106. The plurality of target table documents are searched to retrieve a set of target table documents that include target attributes that correspond to the source attribute. In some implementations, the set of target table documents include a number (e.g., a number "J") of the plurality of target table documents that include target attributes that correspond to the source attribute, 110. A set of target attributed is selected based on a prompt using a retrieval-enhanced large language model (LLM). In one example, the set of target table documents includes a top number (e.g., a number "K") of target attributes that is selected based on a prompt using a retrieval-enhanced large language model. A ranked list of the top potential matches (e.g., top K potential matches) is generated for further review by human schema matching personnel, 114. A retrieval-enhanced large language model (LLM) combines the capabilities of a large language model with a retrieval mechanism to improve the relevance, coherence, and factual accuracy of generated text. Unlike traditional LLMs, which generate responses solely based on input prompts, retrieval-enhanced LLMs leverage an additional retrieval component to fetch and incorporate relevant context from a pre-existing knowledge base or corpus during the generation process.

The retrieval mechanism retrieves contextually relevant information from the knowledge base based on the input prompt and uses this information to inform and guide the generation of the response. This enables the model to incorporate factual information, context, and prior knowledge into the generated text, leading to more informative, accurate, and contextually appropriate responses.

By integrating retrieval-based techniques with large language models, retrieval-enhanced LLMs address some of the limitations of traditional LLMs, such as generating responses that lack factual accuracy or coherence due to limited context awareness. They enable more informed and contextually relevant interactions between users and AI systems, making them suitable for a wide range of applications, including question answering, natural language understanding, dialogue systems, and content generation.

Embodiments of the disclosure utilize a method for the task of schema matching, which allows for scalable and accurate matching results, without any model training or access to labeled data, provides a system to reduce the search space of the target schema for efficient candidate generation, inspired by techniques used in information retrieval (IR), and in particular, by retrieval augmented generation (RAG) methods, and exploits the generative abilities of LLMs, and their text comprehension to perform semantic ranking between two schemas in alignment with human matchers.

Generative language models, like GPT, are trained to generate human-like text and can be fine-tuned for a variety of tasks, but also can be reused for a variety of tasks, with no additional training. Embedding models like BERT or Ada provide contextual embeddings that have significantly improved performance on a wide range of NLP tasks. Moreover, the representation of text via embeddings allows for efficient and accurate passage retrieval, using semantic similarity.

Schema matching involves identifying correspondences between different data schemas and creating a mapping between them. A schema, in its simplest definition, is a representation of the structure of a database. Schema matching, therefore, plays a vital role in data integration, enabling the consolidation of various data sources into a unified, coherent form.

As is known in the art, given two database schemas, a source schema S1 and a target schema S2, with sets of tables T1 and T2 and sets of attributes A1 and A2, respectively, a schema matching task involves finding a mapping between $(A1, T1) \in S1$ to $(A2, T2) \in S2$. The matches between their attributes are captured by a relation match: $P(A1) \times P(A2)$. An element $(A1, A2) \in$ match defines a matching pair possibly representing the same information in the schemas. If $|A1|=1$ and $|A2|=1$, this match is called an elementary match or 1:1 match. Otherwise, it is referred to as a complex match or m:n match.

The goal of automatic schema matching is to find all of the matches that are meaningful. Usually, there are conditions that a collection of meaningful matches has to obey, for instance, that the matches do not overlap. That is, for every pair of matches (a1, a2) and (a3, a4) in the mapping, it both holds that $a1 \cap a3 = \emptyset$ and $a2 \cap a4 = \emptyset$. This collection of matches is called a mapping. From a structural point of view, a mapping is an element of the power set of matches.

The function $\Psi: A1 \rightarrow P(A2)$, such that $\forall a \in A1$, $\forall a' \in \Psi(a)$, $(a, a') \in$ match then needs to be determined. In other words, $\Psi(a) = A' \subseteq A2$, should contain all relevant matches for a.

A possible simplification of this problem can be made by limiting $\Psi$ to be a $N \times K$, $N=|A1|$, $K \in N$, matrix of elements from A2, denoted as $\Psi K$. In the case of elementary matches, or m:1 complex matches, the goal from above now becomes to maximize the accuracy@K metric, i.e., to maximize:

$$\frac{1}{N}\sum^{N} 1\{\exists\, a', (a, a') \in \text{match}, a' \in \Psi_K(a)\} \quad \text{Eq. 1}$$

Embodiments of the disclosure leverage textual descriptions, tables and attribute constraints, and data types, for creating an alignment between source and target schemas. Embodiments adapt passage-based modeling such that each schema element is represented as a structured document, containing all its textual descriptions and information. This representation is utilized to judge the similarity and retrieve relevant documents. Correspondences are derived based on LLM generation, by producing prompts containing source schema attributes (columns) with relevant target schema candidates.

The methodology is composed of three stages. Given a source schema S1 with a set of tables T1 and a set of attributes A1, and a target schema S2 with a set of tables T2 and a set of attributes A2, target schema tables and source schema attributes are first transformed into two corpora of structured documents, Ct (target corpora) and Cs (source corpora), respectively. Each target schema table and source schema attribute is represented as a structured document consisting of four descriptive paragraphs. The title of the document is the table's name, and the opening paragraph provides an overview of the table's purpose and characteristics. The subsequent paragraphs detail the set of attributes serving as the table's primary key, the set of attributes referring to other tables (foreign keys), and the rest of the attributes belonging to this table, respectively. Each attribute is followed by its data type and a textual description. For attribute documents, the specific attribute is highlighted above the title.

Given constraints on prompt size, a retrieval strategy is employed to allow for scalability to large schemas. For each attribute in the source schema, the top J documents are searched for that represent candidate tables from the target schema. These tables should contain the most promising candidate attributes for deriving correspondences. This step ensures that only the most relevant documents are considered for matching, thereby coping with the limitations imposed by the maximal prompt size. To facilitate the retrieval of candidate tables, a text embedding model is utilized to encode both the candidate source attribute, accompanied by its table description, and the corpus of target table documents. These embeddings serve as a basis for measuring semantic similarity, enabling the efficient retrieval of candidate tables. For every source table $ti \in T1$, a set of all top J candidate tables Tc retrieved is created.

In the last step, the LLM is tasked with selecting the top K most similar target attributes from the set of retrieved tables Tc. The model assesses the similarity based on the context provided by the document representations, yielding a ranked list of K potential matches for each attribute in the source schema.

Figure 2:
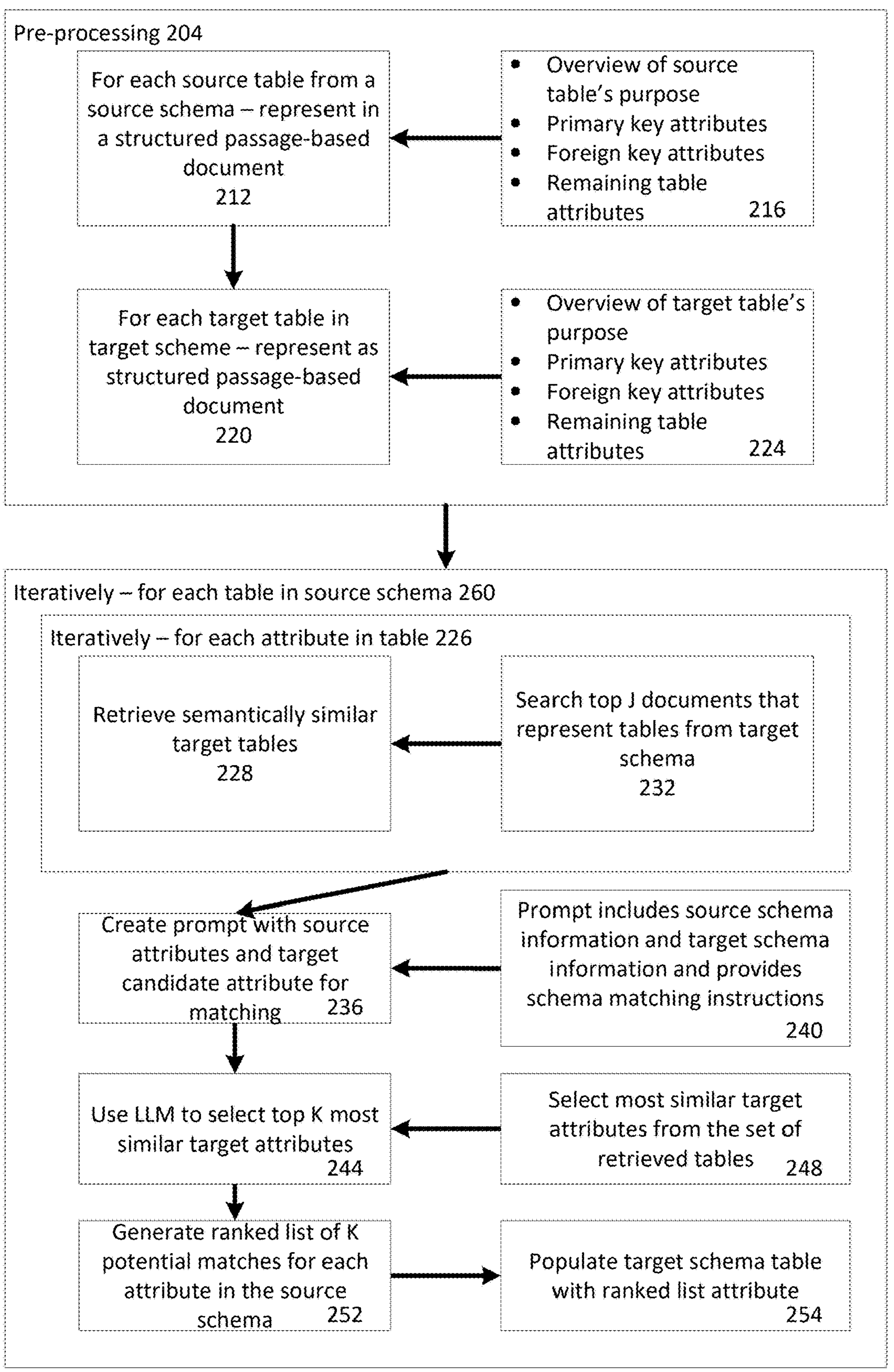
FIG. 2 is a flowchart showing the operation of the schema matching process of embodiments of the disclosure.

Referring now to FIGS. 2-9, an embodiment of the disclosure will be described. FIG. 2 is a flow diagram of tasks involved in performing the schema matching method. FIG. 3 depicts a source table 300 entitled "Admissions Table" including columns, also referred to as attributes 304 (Patient ID), 308 (Hosp ID), and 312 (Admit Time), among others. For the purpose of this description, the attribute that is focused on is the Admit Time attribute 312. The source table 300 is structured according to a source schema which, in this example, is referred to as the "hospital database" schema. Example database schemas include a hospital database schema and an analytical database schema.

FIG. 4 depicts a target table 400 entitled "Visits Table" including columns, also referred to as attributes 404, (Person ID), 408 (Visit ID) and 412 (Start Datetime), among others. For the purpose of this description, the attribute that is focused on is the Start Datetime attribute 412. The target table 400 is structured according to a target schema which, in this example, is referred to as the "analytical data model" schema. While only one target table is shown, in accordance with embodiments of the disclosure, a plurality of target tables are retrieved when performing the schema matching process.

In a pre-processing step 204, for each source table from the source schema, the source attributes are represented in a structured passage-based document 212 and, for each target table in the target schema, the target tables are represented in a structured passage-based document 220. In the case of the source attributes, the source table document includes an overview of the source table's purpose, the source table's primary key attributes, the source table's foreign key attributes, and the remaining source table attributes, 216. Likewise, in the case of each target table, the target table document includes an overview of the target table's purpose, the target table's primary key attributes, the target table's foreign key attributes, and the remaining target table attributes, 224.

Figure 5:
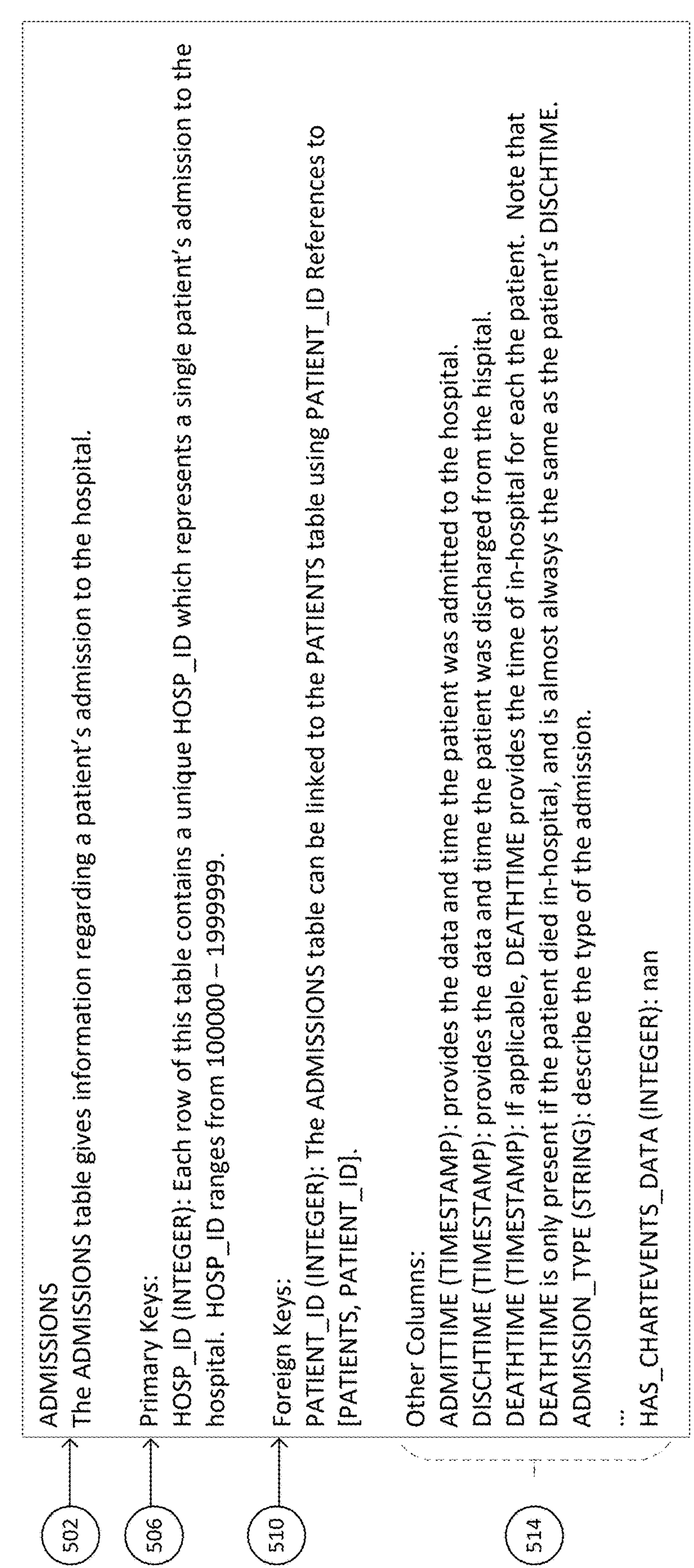
FIG. 5 depicts a structured passage-based document corresponding to a source table.

An example of a structured passage-based source table document is shown at 500 in FIG. 5. As described above, each document includes a text description overview of the source table's purpose 502, a text description of the source table's primary key attributes 506, a text description of the source table's foreign key attributes 510, and text descriptions of the remaining source table attributes, 514. In sections 506, 510, and 514, each line also includes a form descriptor of the associated attribute, e.g., "INTEGER," "TIMESTAMP," and "STRING." Although not shown, documents corresponding to the target tables include similar text descriptions and form descriptors for each attribute in the target structured document.

Referring to FIG. 2, tasks 228 and 232, described below, are executed iteratively for each attribute in a source table, 226. Tasks 226 through 252 are then executed iteratively for each table in the source schema, 260. When matching database schema, a goal is to locate similar data in each table in which, because the source database and the target database are constructed using different schema, corresponding attributes may be listed under different attribute names in each database. Based on the structured passage-based document generated for the source table, when matching an attribute in the source table to target tables, a number of semantically-similar target tables are retrieved, 228. More specifically, based on the text descriptions for the source attribute in the source table, when the target tables are searched for similarities with the source attribute, the documents associated with each of a number J of target tables being most similar are flagged as relevant to the attribute of the source table, 232.

A prompt is created containing source attributes and target candidate attributes, 236, which is used by a retrieval-enhanced large language model (LLM) to select the top K most similar target attributes from the top J documents that represent the candidate target tables, 244. In the context of a Large Language Model (LLM), a prompt refers to the initial input or query provided by a user to prompt the model to generate a response or complete a task. When interacting with an LLM, users typically start by providing a prompt that outlines the desired task, question, or context for the model to follow.

Selecting the top K most similar target attributes includes selecting, from the target tables retrieved in task 228, attributes most similar to the source attribute, 248. In an embodiment, the prompt is created by a human user. In other embodiments, the prompt may be created solely by use of artificial intelligence, generative pre-trained transformer (GPT), any other computer system capable of generating the prompt, or a combination of human and computer-generated. The prompt includes source schema information and target schema information and provides schema matching instructions, 240.

An example prompt 900 is shown in FIG. 9. Prompt 900 includes a text description of the desired schema matching outcome, 904. The expected output format is specified, 908. This sets forth the format of the source table "SRC_ENT" and source attribute "SRC_ATT" for which the target tables will be searched. The source table name "SOURCE_TABLE_NAME" and source column name "SOURCE_COLUMN_NAME" are also specified. Each of the included target tables is indicated similarly (e.g., "TGT_ENT1," "TGT_ATT1", "TGT_ENT2," and "TGT_ATT2,") as well as the names for the tables and attributes.

The source schema is specified at 912, including names of the table (SRC_ENT) and each attribute (SRC_ATT). Each attribute in the table is listed in this section (not all are shown here for brevity). The table (e.g., ADMISSIONS) and each attribute are provided with a textural description, 916. Similarly to the source information, the target schema is specified at 920, including names of the table (TGT_ENT) and each attribute (TGT_ATT). Each attribute in the table is listed in this section (not all are shown here for brevity). The tables (e.g., PERSON, VISITS) and each attribute are provided with a textural description, 924. Further textual instructions are provided at 928.

Once the top K most similar target attributes are selected by the LLM, 244, a ranked list of K potential matches for each attribute in the source schema is generated, 252. This ranked list may then be processed by, for example, a human schema matcher to align the relevant information in each set of tables. Once the ranked list is generated, a table in the target schema can be populated to include one of the top-ranked target attributes that match the corresponding attribute in the source schema table.

An example of the schema matching system and method will now be described with reference to FIGS. 3, 4, 6-8, and 10. FIG. 6 depicts an example statement in which the number of target tables that will be selected to match with the source attribute, J, is 2 and the top number of matches that will be selected for the source attribute, K, is 3. The inputs are the source schema, an example of which is a hospital database schema and the target schema, an example of which is an analytical data model schema. The desired outputs are, for every attribute (column) in the hospital database (source), three (K) possible matching columns from the analytical data model schema. Referring to FIGS. 7 and 8, for this example, consider the ADMIT_TIME column or attribute in the ADMISSIONS source table. This is shown at row 602 in FIG. 7. In FIG. 7, table 700 includes column 702, which indicates the name of the source table being processed and column 704 indicates the source attribute for which matches in the target tables is sought. As specified in FIG. 6, the number of tables that will be retrieved is J or 2. Column 706 indicates the name of the first analytical target table, VISITS and column 708 indicates the name of the corresponding target attribute in the VISITS target table, "start_datetime." Following tasks 228 and 232 in FIG. 2, column 710 indicates the name of the second analytical target table, VISIT_DETAIL and column 712 indicates the name of the corresponding target attribute in the VISIT_DETAIL target table, "start_datetime." In this example, the number of retrieved tables was J=2, but number of matched attributes is K=3, not J. The reason for the blanks in columns 714 and 716 is since the system is allowed to assign between one to K null matches, if not enough matches were found, the columns are left blank.

FIG. 8 depicts the output 800 following tasks 244 and 248 of FIG. 2. Specifically, the top 3 (corresponding to K) most similar target attributes are included in the ranked list of K potential matches for each attribute in the source schema (corresponding to task 252 of FIG. 2). Shown in columns 802 and 806 are the target table and attribute that is the highest ranked as being most similar to the source attribute ADMIT_TIME in the source table. Here, 802 indicates target table VISITS and 806 indicates target attribute "start_datetime." Shown in columns 810 and 814 are the target table and attribute that is the second highest ranked as being most similar to the source attribute ADMIT_TIME in the source table. Here, 810 indicates target table VISIT_DETAIL and 814 indicates target attribute "start_datetime." Shown in columns 818 and 822 are the target table and attribute that is the third highest ranked as being most similar to the source attribute ADMIT_TIME in the source table. Here, 818 indicates target table VISIT_DETAIL and 822 indicates target attribute "end_datetime." Since, in this example, K=3, output 800 shows the three top ranked mappings associated with the source attribute ADMIT_TIME in source table ADMISSIONS.

FIGS. 10A and 10B depict a result of matching the attributes of source table 300 (FIG. 3) with attributes of target table 400 (FIG. 4). As can be seen, even though the names of the attributes in source table 850 (FIG. 10A) have different names than the attributes in target table 870 (FIG. 10B), the process described herein is able to match the information corresponding to source attributes in the source table with similar target attributes in the target table. Only attributes in the source table 850 that match attributes in the target table are included in the target table 870. These matching attributes are shaded in grey. For example, row 886 in target table 870 corresponds to row 866 in source table 850 and row 888 in target table 870 corresponds to row 868 in source table 850. In these rows, target attribute "Person ID" 872 corresponds to source attribute "Patient ID" 852; target attribute "Visit ID" 874 corresponds to source attribute "Hosp ID" 854; target attribute "Start Datetime" 876 corresponds to source attribute "Admit_time" 856; target attribute "End Datetime" 878 corresponds to source attribute "Disch_time" 858; target attribute "Visit Type" 880 corresponds to source attribute "Admission Type" 860; target attribute "Admitted from" 882 corresponds to source attribute "Admission location" 862; and target attribute "Discharge to" 884 corresponds to source attribute "Discharge Location" 864. In this way, the values associated with each source attribute in the source table 850 are matched with the corresponding target attributes in the target table 870.

Accordingly, embodiments of the disclosure are directed to a system for matching attributes between a source database having a first schema and a target database having a second schema. A source attribute in a source table is represented as a passage-based structured document and a plurality of target tables are represented as passage-based structured documents. The plurality of target table documents are searched to retrieve a number J of the plurality of target table documents that include target attributes that correspond to the source attribute. A top number K of target attributes is selected based on a prompt using a retrieval-enhanced large language model. A ranked list of the top K potential matches is generated for further review by human schema matching personnel.

Figure 11:
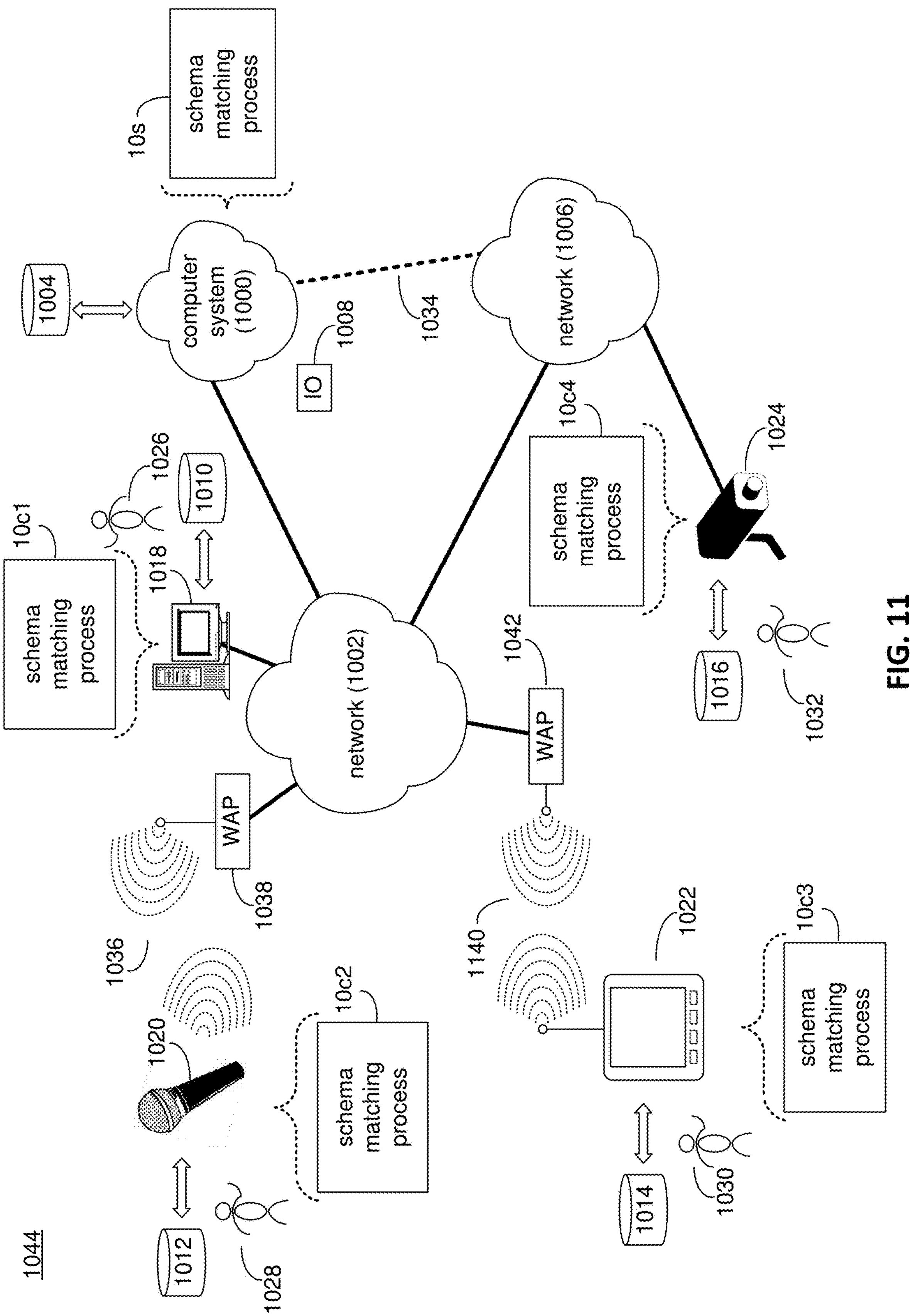
FIG. 11 is a diagrammatic view of a computer system and the operating system and schema matching process coupled to a distributed computing network.

System Overview:

Referring to FIG. 11, there is shown a schema matching process 1044. Schema matching process 1044 may be implemented as a server-side process, a client-side process, or a hybrid server-side/client-side process. For example, schema matching process 1044 may be implemented as a purely server-side process via computational cost reduction process 10*s*.

Alternatively, schema matching process 1044 may be implemented as a purely client-side process via one or more of schema matching process 10*c*1, schema matching process 10*c*2, schema matching process 10*c*3, and schema matching process 10*c*4. Alternatively still, schema matching process 1044 may be implemented as a hybrid server-side/client-side process via schema matching process 10*s* in combination with one or more of schema matching process 10*c*1, schema matching process 10*c*2, schema matching process 10*c*3, and schema matching process 10*c*4.

Accordingly, schema matching process 1044 as used in this disclosure may include any combination of schema matching process 1044, schema matching process 10*c*1, schema matching process, schema matching process 10*c*3, and schema matching process 10*c*4.

schema matching process 10*s* may be a server application and may reside on and may be executed by a computer system 1000, which may be connected to network 1002 (e.g., the Internet or a local area network). Computer system 1000 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

A SAN includes one or more of a personal computer, a server computer, a series of server computers, a minicomputer, a mainframe computer, a RAID device and a NAS system. The various components of computer system 1000 may execute one or more operating systems.

The instruction sets and subroutines of computational cost reduction process 10*s*, which may be stored on storage device 1004 coupled to computer system 1000, may be executed by one or more processors (not shown) and one or more memory architectures (not shown) included within computer system 1000. Examples of storage device 1004 may include but are not limited to: a hard disk drive; a RAID device; a random-access memory (RAM); a read-only memory (ROM); and all forms of flash memory storage devices.

Network 1002 may be connected to one or more secondary networks (e.g., network 1004), examples of which may include but are not limited to: a local area network; a wide area network; or an intranet, for example.

Various IO requests (e.g., IO request 1008) may be sent from schema matching process 10*s*, schema matching process **10*c*1, schema matching process 10*c*2, schema matching process 10*c*3 and/or schema matching process 10*c*4 to computer system 1000. Examples of IO request 1008 may include but are not limited to data write requests (i.e., a request that content be written to computer system 1000) and data read requests (i.e., a request that content be read from computer system 1000**).

The instruction sets and subroutines of schema matching process **10*c*1, schema matching process 10*c*2, schema matching process 10*c*3 and/or schema matching process 10*c*4, which may be stored on storage devices 1010, 1012, 1014, 1016 (respectively) coupled to client electronic devices 1018, 1020, 1022, 1024 (respectively), may be executed by one or more processors (not shown) and one or more memory architectures (not shown) incorporated into client electronic devices 1018, 1020, 1022, 1024 (respectively). Storage devices 1010, 1012, 1014, 1016 may include but are not limited to: hard disk drives; optical drives; RAID devices; random access memories (RAM); read-only memories (ROM), and all forms of flash memory storage devices. Examples of client electronic devices 1018, 1020, 1022, 1024 may include, but are not limited to, personal computing device 1018 (e.g., a smart phone, a personal digital assistant, a laptop computer, a notebook computer, and a desktop computer), audio input device 1020 (e.g., a handheld microphone, a lapel microphone, an embedded microphone (such as those embedded within eyeglasses, smart phones, tablet computers and/or watches) and an audio recording device), display device 1022** (e.g., a tablet computer, a computer monitor, and a smart television), a hybrid device (e.g., a single device that includes the functionality of one or more of the above-references devices; not shown), an audio rendering device (e.g., a speaker system, a headphone system, or an earbud system; not shown), and a dedicated network device (not shown).

Users 1026, 1028, 1030, 1032 may access computer system 1000 directly through network 1002 or through secondary network 1006. Further, computer system 1000 may be connected to network 1002 through secondary network 1006, as illustrated with link line 1034.

The various client electronic devices (e.g., client electronic devices 1018, 1020, 1022, 1024) may be directly or indirectly coupled to network 1002 (or network 1006). For example, personal computing device 1018 is shown directly coupled to network 1002 via a hardwired network connection. Further, machine vision input device 1024 is shown directly coupled to network 1006 via a hardwired network connection. Audio input device 1022 is shown wirelessly coupled to network 1002 via wireless communication channel 1036 established between audio input device 1020 and wireless access point (i.e., WAP) 1038, which is shown directly coupled to network 1002. WAP 1038 may be, for example, an IEEE 802.11a, 802.11b, 802.11g, 802.11n, Wi-Fi, and/or any device that is capable of establishing wireless communication channel 1036 between audio input device 1020 and WAP 1038. Display device 1022 is shown wirelessly coupled to network 1002 via wireless communication channel 1040 established between display device 1022 and WAP 1042, which is shown directly coupled to network 1002.

The various client electronic devices (e.g., client electronic devices 1018, 1020, 1022, 1024) may each execute an operating system, wherein the combination of the various client electronic devices (e.g., client electronic devices 1018, 1020, 1022, 1024) and computer system 1000 may form modular system 1044.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method for matching a source schema to a target schema, said method being executed by a computing device and comprising:

accessing a source table that has a first table schema, wherein the source table includes a source attribute;

generating a source document that uses first text to describe the source attribute, wherein the first text semantically describes the source attribute, and the first text is structured in accordance with a passage-based structured document format;

accessing a plurality of target tables, at least some of which have a second table schema;

generating a plurality of target documents that use second text to describe target attributes included in the plurality of target tables, wherein the second text semantically describes the target attributes, and the second text is also structured in accordance with the passage-based structured document format;

searching the plurality of target documents to identify a set of target documents whose target attributes are determined to correspond to the source attribute;

based on the identified set of target documents, retrieving a set of target tables that correspond to the identified set of target documents, such that the set of target tables include the target attributes that are determined to correspond to the source attribute;

selecting a set of the target attributes from the retrieved set of target tables; and generating a ranked list that is formed from the set of target attributes, wherein target attributes that are included in the ranked list are ones that are determined to that match the first-source attribute.

2. The computer-implemented method of claim 1, wherein the source attribute comprises contents of a column in the source table.

3. The computer-implemented method of claim 1, wherein a large language model (LLM) selects the set of the target attributes.

4. The computer-implemented method of claim 1, wherein a large language model determines that the target attributes correspond to the source attribute.

5. The computer-implemented method of claim 1, wherein searching the plurality of target documents is performed based on semantic similarity between the source attribute and the target attributes.

6. The computer-implemented method of claim 5, further comprising:

encoding the second text using an embedding model to generate embeddings of the second text.

7. The computer-implemented method of claim 6, wherein the embeddings serve as a basis for measuring semantic similarity.

8. The computer-implemented method of claim 3, wherein selecting the set of the target attributes includes generating a prompt for use by the LLM.

9. A computer system comprising:

one or more processors; and one or more hardware storage devices that store instructions that are executable by the one or more processors to cause the computer system to:

access a source table that has a first table schema, wherein the source table includes a source attribute;

generate a source document that uses first text to describe the source attribute, wherein the first text semantically describes the source attribute, and the first text is structured in accordance with a passage-based structured document format;

access a plurality of target tables, at least some of which have a second table schema;

generate a plurality of target documents that use second text to describe target attributes included in the plurality of target tables, wherein the second text semantically describes the target attributes, and the second text is also structured in accordance with the passage-based structured document format;

search the plurality of target documents to identify a set of target documents whose target attributes are determined to correspond to the source attribute;

based on the identified set of target documents, retrieve a set of target tables that correspond to the identified set of target documents, such that the set of target tables include the target attributes that are determined to correspond to the source attribute;

select a set of the target attributes from the retrieved set of target tables; and generate a ranked list that is formed from the set of target attributes, wherein target attributes that are included in the ranked list are ones that are determined to match the source attribute.

10. The computer system of claim 9, wherein the source attribute is encoded.

11. The computer system of claim 9, wherein the target documents are encoded.

12. The computer system of claim 9, wherein the source attribute is a column descriptor of a column in the source table.

13. The computer system of claim 9, wherein the source document includes an overview of a purpose of the source table.

14. The computer system of claim 9, wherein the source document includes a description of primary key attributes of the source table.

15. The computer system of claim 9, wherein the source document includes a description of foreign key attributes of the source table.

16. The computer system of claim 9, wherein the source document includes descriptions of other source attributes of the source table.

17. The computer system of claim 9, wherein a target document that is included among the plurality of target documents includes: an overview of a purpose of the target document, a description of primary key attributes of the target table, a description of foreign key attributes of the target table, and other target attributes of the target table.

18. One or more hardware storage devices that store instructions that are executable by one or more processors to cause the one or more processors to:

access a source table that has a first table schema, wherein the source table includes a source attribute;

generate a source document that uses first text to describe the source attribute, wherein the first text semantically describes the source attribute, and the first text is structured in accordance with a passage-based structured document format;

access a plurality of target tables, at least some of which have a second table schema;

generate a plurality of target documents that use second text to describe target attributes included in the plurality of target tables, wherein the second text semantically describes the target attributes, and the second text is also structured in accordance with the passage-based structured document format;

search the plurality of target documents to identify a set of target documents whose target attributes are determined to correspond to the source attribute;

based on the identified set of target documents, retrieve a set of target tables that correspond to the identified set of target documents, such that the set of target tables include the target attributes that are determined to correspond to the source attribute;

select a set of the target attributes from the retrieved set of target tables; and generate a ranked list that is formed from the set of target attributes, wherein target attributes that are included in the ranked list are ones that are determined to match the source attribute.

19. The one or more hardware storage devices of claim 18, wherein the source attribute is encoded.

20. The one or more hardware storage devices of claim 18, wherein the target documents are encoded.

* * * * *